UNITED STATES PATENT OFFICE.

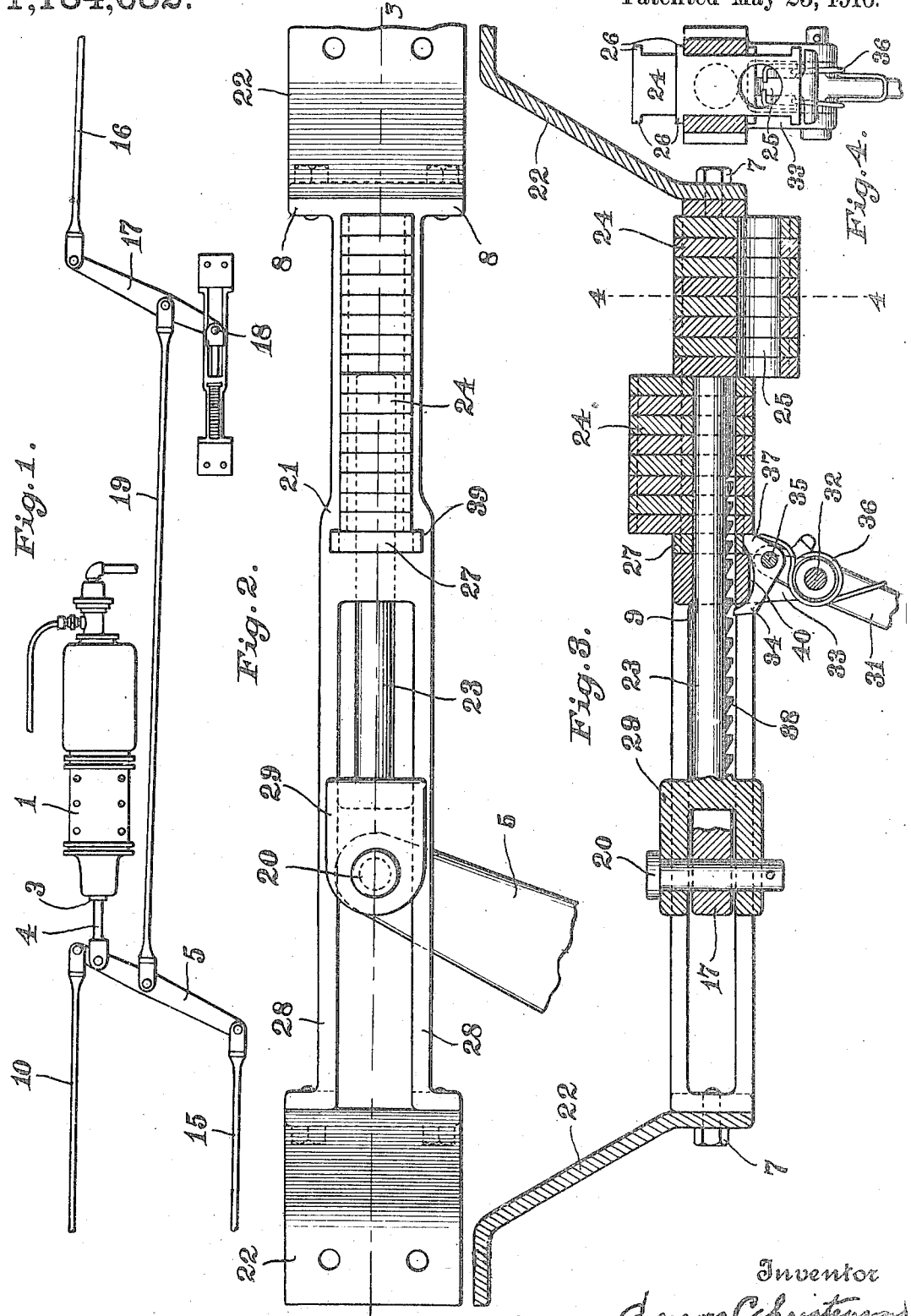

GEORGE CHRISTENSON, OF JAMAICA, NEW YORK, ASSIGNOR TO H. W. JOHNS-MANVILLE COMPANY, A CORPORATION OF NEW YORK.

SLACK TAKE-UP FOR FLUID-PRESSURE BRAKE SYSTEMS.

1,184,682.   Specification of Letters Patent.   Patented May 23, 1916.

Application filed August 2, 1915. Serial No. 43,317.

*To all whom it may concern:*

Be it known that I, GEORGE CHRISTENSON, a citizen of the United States of America, residing at Jamaica, county of Queens, State of New York, have invented certain new and useful Improvements in Slack Take-Ups for Fluid-Pressure Brake Systems, of which the following is a specification.

My invention relates to fluid pressure brake systems and consists of an improvement upon the invention disclosed in my application Serial No. 1399, filed January 9, 1915, in that it is more particularly designed for use on cars where the hand operated brake mechanism is connected to the loose push rod usually employed in the standard freight car brake rigging. In the particular form of mechanism shown and described in my said pending application, it is evident that if the hand operated connections are applied to the floating lever of the main brake rigging at the point of said lever's attachment to the power operated members the operation of the take-up mechanism will disarrange the adjustment of the hand brake connections, so that it might follow that the brakes could not be effectively applied by said hand operated connections. My present invention involves a rearrangement of the parts which avoids this difficulty and causes the take-up device to operate equally well upon both the hand and power operated connections, and presents certain other features hereinafter claimed.

The best form of apparatus at present known to me embodying my invention is illustrated in the accompanying sheet of drawings, in which:

Figure 1 is a plan view of a portion of a standard brake rigging for freight cars with my invention applied thereto. Fig. 2 is an enlarged plan view of the take-up device. Fig. 3 is a vertical section on line 3—3 of Fig. 2, and Fig. 4 is a cross section on line 4—4 of Fig. 3.

Throughout the drawings like reference characters indicate like parts.

1, is the usual air brake cylinder having piston (not shown) with hollow piston rod 3, in which is loosely mounted the push rod 4, which is pivoted to the floating lever 5, of the main brake rigging.

The standard brake rigging is represented by the tension rods 15 and 16, the multiplying lever 17, pivoted to the car body at 18, and tie rod, all of standard construction.

The adjustable take-up mechanism comprises an adjustable fulcrum for the multiplying lever 17. This lever is pivoted by pin 20, to cross head 29, which slides in cross head guides formed by projecting ears 28, 28, on a rectangular frame 21. This frame is supported from the under side of the car body by brackets 22, 22, to which it is fastened by bolts 7, 7, passing through ears 28, and 8. Fastened to cross head 29, is ratchet rod 23, extending parallel to ears 28, of frame 21. Coöperating with the teeth 38, on rack rod 23, is pawl 34, pivoted at 35, on the lever 31, which in turn is pivotally mounted by pin 32, in the ears 33, 33, dependent from the rectangular frame 21. 36, is a spring which normally forces the lower end of lever 31, to the left and also tends to hold the pawl 34, in yielding engagement with the rack teeth. Within the rectangular frame 21, are mounted a series of transversely movable shims 24, each of which has a perforation 25, large enough to freely admit the passage of the ratchet rod 23, and which has lugs 26, 26, upon its upper and lower ends normally preventing the withdrawal of the shim from the rectangular frame. 27, is a keeper for the shims which fits into a wider slot 39, in the rectangular frame, which slot is of sufficient size to permit the passage of the lugs 26, on shims 24. This keeper 27, is locked in position by the ratchet rod 23, passing through a perforation 9, in it of diameter equal to that of the perforation in the shims 24. The pawl 34, has a dog 37, formed at its rear end adapted to press against the lower edge of the outermost shim 24, when the lever 31, is forced by spring 36, into the position shown in Fig. 3.

The operation of the invention is as follows: Oscillation of lever 31, causes the pawl 34, to engage ratchet teeth 38, and forces ratchet rod 23, and cross head 29, outward from the shims 24, by step by step action. As the ratchet rod moves out, shims 24, drop behind it one by one, forming a solid abutment preventing the return of the ratchet rod. This movement of ratchet rod and cross head 29, moves the multiplying lever 17 outward and takes up any desired amount of slack in the brake rigging. When the operator lets go of lever 31, the spring forces it into the position shown in Fig. 3, and causes dog 37, to bear against the shims 24, with yielding pressure which holds the whole series of shims together and prevents rattling. Whenever the brakeman operates the brakes by hand by twisting the hand wheel, the tension is transmitted through tension rod 10, to the push rod and connections in the usual way, pulling the push rod out of the hollow piston, applying force to the floating lever 5, and so applying the brakes.

The operation of the particular pawl mechanism shown is as follows: Normally the lever 31, is held in the position shown in Fig. 3, with the pawl 34, withdrawn from engagement with ratchet teeth 38. When the lower end of lever 31, is swung to the right, pawl 34, is forced to the left, and dog 37, riding under the portion 40, of frame 21, forces the nose of the pawl up into positive engagement with one of ratchet teeth 38, driving the ratchet rod 23, outward far enough to allow another shim 24, to drop behind it. When lever is released, spring 36, throws it into the position shown.

It is evident that the adjustment of the take-up device operates equally well upon the power and hand operated devices, as the relative position of the cross head 29, and rectangular frame 21, is not disturbed by operation of either the hand or power devices.

Having described my invention, I claim:

1. In a take-up apparatus for fluid pressure brakes the combination with the usual cylinder, piston and brake rigging, including a multiplying lever, of an adjustable fulcrum for the multiplying lever and manually operated means for adjusting said fulcrum when the brake rigging is under tension, comprising a ratchet rod connected to the fulcrum, a hand lever, and a pawl on the hand lever engaging the ratchet teeth.

2. In a take-up apparatus for fluid pressure brakes the combination with the usual cylinder, piston and brake rigging, including a multiplying lever, of an adjustable fulcrum for the multiplying lever and manually operated means for adjusting said fulcrum when the brake rigging is under tension, comprising a ratchet rod connected to the fulcrum, a hand lever, and a pawl on the hand lever engaging the ratchet teeth, together with a series of perforated shims arranged in line with the end of said ratchet rod, provided with perforations to receive the ratchet rod, and capable of transverse movement so that said perforations may be in line or out of line with said rod.

3. In a take-up apparatus for fluid pressure brakes the combination with the usual brake rigging including a multiplying lever having a fulcrum normally fixed with relation to the car body, of means for adjusting said fulcrum while the brake rigging is under tension which comprises a cross head mounted in guides fixed with reference to the car body and arranged approximately parallel to the adjacent tension rods of the brake rigging, a ratchet rod connected to said cross head, a series of perforated shims adapted to ride on said ratchet rod or drop behind it, a fixed abutment for said series of shims, a hand lever mounted on a fixed pivot, and a pawl carried by said lever engaging the ratchet rod.

4. In a slack take-up for brake systems and the like the combination of a pair of guides, a cross head mounted thereon, a ratchet rod attached to the cross head, a lever pivoted on the guides, a pawl pivoted on the lever, provided with a rearwardly extending dog, and adapted to engage the teeth on the ratchet rod when the lever is oscillated through a certain arc, and a trip surface attached to the guides over which the pawl and dog run so shaped as to coöperate with the pawl and pull the pawl out of engagement with the ratchet teeth when the lever is swung to one side, and to coöperate with the dog to force the pawl into engagement with the ratchet teeth when the lever is swung in the opposite direction.

GEORGE CHRISTENSON.

Witnesses:
A. PARKER-SMITH,
M. G. CRAWFORD.